United States Patent [19]

Dieleman

[11] Patent Number: 4,630,569
[45] Date of Patent: Dec. 23, 1986

[54] SELF-CLEANING BIRDBATH APPARATUS

[76] Inventor: Lawrence A. Dieleman, 2119 Tulip La., Jenison, Mich. 49428

[21] Appl. No.: 729,979

[22] Filed: May 2, 1985

[51] Int. Cl.⁴ ............................................. A01K 29/00
[52] U.S. Cl. ........................................ 119/1; 119/74; 239/204
[58] Field of Search ................. 119/1, 74; 239/29, 30, 239/70, 101, 204, 205; 134/167 R; 4/196, 206, 490

[56] References Cited

U.S. PATENT DOCUMENTS

| | | | |
|---|---|---|---|
| 1,044,033 | 11/1912 | Dunphy | 239/29 |
| 1,882,922 | 10/1932 | Robinson et al. | 239/204 X |
| 1,962,840 | 6/1934 | Rives | 299/12 |
| 2,106,871 | 2/1938 | Hogsett | 119/74 |
| 2,250,759 | 7/1941 | Gardner | 119/74 |
| 2,464,580 | 3/1949 | Johnson | 119/1 |
| 2,496,030 | 1/1950 | Winey | 119/72 |
| 2,607,623 | 8/1952 | Lippert | 239/204 |
| 2,878,781 | 3/1959 | Wingfield | 119/72 |
| 2,989,247 | 6/1961 | Tropeano et al. | 239/206 |
| 3,696,786 | 10/1972 | Garwood | 119/1 |
| 3,734,057 | 5/1973 | Lee et al. | 119/1 |
| 3,747,129 | 7/1973 | Dyar | 4/1 |
| 3,770,203 | 11/1973 | Dyar | 239/205 |
| 3,782,630 | 1/1974 | Sabo | 239/70 |
| 3,995,591 | 12/1976 | Garwood | 119/1 |
| 4,176,395 | 11/1979 | Evelyn-Veere et al. | 364/420 |
| 4,188,673 | 2/1980 | Carter | 4/172.17 |
| 4,212,088 | 7/1980 | Goettl et al. | 4/490 |
| 4,216,092 | 8/1980 | Shalhoob et al. | 210/222 |
| 4,232,707 | 11/1980 | Sturman et al. | 239/70 X |
| 4,383,341 | 5/1983 | Altman | 4/662 |
| 4,466,142 | 8/1984 | Gould | 239/204 X |
| 4,503,573 | 3/1985 | Handzel | 4/490 X |

FOREIGN PATENT DOCUMENTS 596724  4/1960  Canada .

Primary Examiner—Robert P. Swiatek
Attorney, Agent, or Firm—Price, Heneveld, Huizenga & Cooper

[57] ABSTRACT

A birdbath assembly is disclosed for controlled, automatic filling, self-cleaning and emptying with water pressure. The assembly includes a spray nozzle mounted for sliding movement through the inside surface of a bowl in response to water pressure. A series of solenoid operated fluid valves are sequentially opened by a preset electrical timing control to provide low water flow to fill the bowl, a subsequent greater water flow to raise the nozzle, agitate the water and any effluents in the bowl, and remove/expel the water and effluents from the bowl, followed by further low water flow to refill the bowl for reuse. A kit for converting conventional birdbaths to the present self-cleaning and filling invention is also disclosed.

31 Claims, 6 Drawing Figures

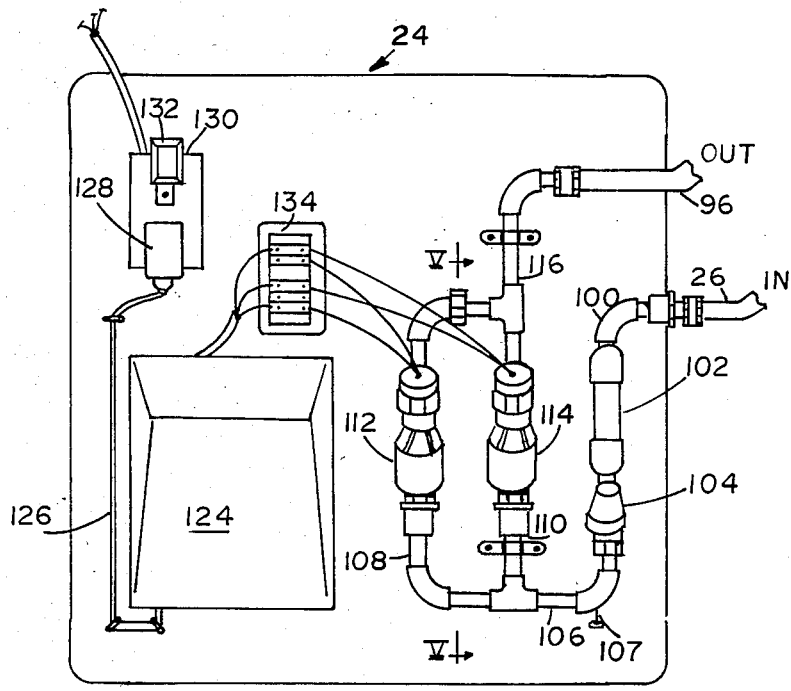
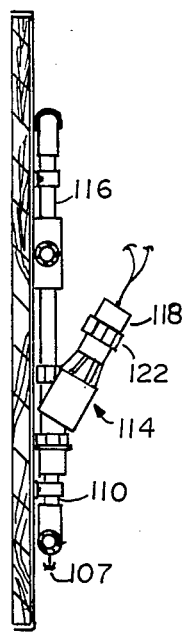
FIG. 4  FIG. 5
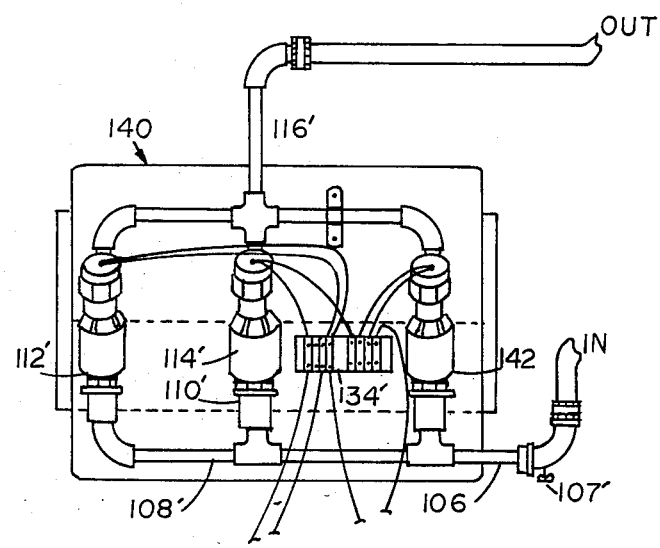
FIG. 6

SELF-CLEANING BIRDBATH APPARATUS

BACKGROUND OF THE INVENTION

This invention relates to self-cleaning and filling birdbaths for use by birds or other animals for drinking and bathing. More particularly, the invention is a self-cleaning birdbath which uses water pressure and a pressure responsive spray nozzle to fill a bath bowl, agitate the water and any effluents in the bowl, remove/expel the water and effluents from the bowl, and refill the bowl with water for reuse.

Many varieties of birdbaths have been devised in the past. The most common is a simple bowl supported on a pedestal for use in a yard, park or other area. Birds and other animals frequent such baths for drinking, washing or bathing and, consequently, often leave dirt, excrement and other effluents in the water contained in the birdbath. With such conventional structures, it is necessary to frequently wash the bowl area of the bath and refill the bowl with clean water. If the owner of the birdbath is away for any extended period, such maintenance cannot be properly attended to and the bath will remain dirty and unused by the birds and animals.

Because of such problems, various methods have been devised for filling or emptying birdbath structures. For instance, Wingfield Pat. No. 2,878,781 discloses a bath installation for birds including a bowl having a central column which includes both a central water supply pipe and surrounding drain holes. Water fills the bowl to the level of the drain holes but no farther. However, no structure for cleaning the bowl or removing dirty water is Examples of self-cleaning birdbaths are shown in Garwood Pat. Nos. 3,696,786 and 3,995,591. In these structures, the entire bowl area of the assembly is pivoted for movement from a horizontal, water containing position to a substantially vertical, water removal position. Movement between the two positions is caused in one case by overflow water caught in a suspended receptacle which pulls the bowl to its inclined position and, in the other case, by water pressure which fills a fluid cylinder to push the bowl to its emptying position.

Other animal drinking structures have included various automatic water filling apparatus. However, all required at least some manual cleaning, manual control or insertion of the water in the bowl.

Accordingly, the need was apparent for an automatic birdbath structure which would operate periodically without intervention to fill, clean and empty itself reliably. It was also desired to provide such a structure wherein the filling, cleaning and emptying apparatus was unobtrusive and remained out of the way of the birds and animals except during the filling, cleaning and emptying process. It was further desired to obtain such a structure which could be easily adapted for use with residential or commercial water systems, be installed inexpensively, and require relatively few and reliable parts. The present invention was conceived in recognition of and as a solution for these problems.

SUMMARY OF THE INVENTION

The present invention provides a birdbath assembly adapted for controlled, automatic filling, self-cleaning and emptying using water pressure. In one embodiment, the assembly includes a bowl for receiving and holding a quantity of water, means for supporting the bowl, and water directing apparatus on the bowl which operates through the inside surface of the bowl. The water directing apparatus sequentially fills the bowl by inserting water under pressure into the bowl, agitates the water in the bowl to generate loosening of any dirt or other substances in the bowl, removes/expels the water and loosened substances from the bowl, and refills the bowl with water. Connecting structure for connecting the water directing apparatus to a source of water under pressure is also included.

In another form of the invention, the birdbath assembly includes a bowl, means for supporting the bowl, and a spray nozzle mounted for movement through the inside surface of the bowl for filling, agitating, emptying and refilling the bowl. Fluid responsive structure for moving at least a portion of the spray nozzle through the inside bowl surface in response to water pressure to direct water spray within the bowl for agitation and subsequent removal of the water and effluents from the bowl is provided. Further, connecting structure for connecting the spray nozzle with a source of water is also included.

Other aspects of the invention include a control system for remotely controlling the rate of flow of water through the water directing apparatus or spray nozzle. In the preferred embodiments, the control system includes a plurality of electric solenoid operated fluid valves which provide sequential low and high volume water flow to the water directing apparatus or nozzle. The solenoid operated fluid valves are in turn controlled by an electrical timing device which automatically opens and closes the fluid valves that regulate low and high volume water flow for preset periods of time. The fluid valves operate sequentially and separately to accomplish the desired result.

The invention may also comprise a kit for converting an existing birdbath bowl to a controlled, water pressure operated filling, self-cleaning and emptying birdbath assembly. Such kit includes a nozzle, fluid responsive structure for moving the nozzle between raised and lowered positions for agitation and removal of the water and effluents and connecting structure. A control system as described above may also be included.

In its broader aspects, the present self-cleaning birdbath invention reliably cycles to fill, clean, empty and refill on a timed cycle set by the owner as desired. Such cycling occurs at predetermined times during each 24 hour time period as set on the control system. Such cycling also occurs without intervention by the owner and, thus, can maintain the birdbath in its clean, usable condition even during the absence of the owner.

Other advantages include the recessed, hidden mounting of the spray cleaning assembly such that it is inserted by water pressure into the bowl for filling, cleaning, emptying and refilling, but is retracted after such cycling to avoid obstruction of the birdbath during use by birds and animals and to prevent damage to the structure. The overall assembly is low in maintenance and includes high reliability parts of which few are moving. Indeed, the more sensitive electrical controls and valving can be located in a nearby building or residence adjacent the birdbath and to more fully protect the system. The bath assembly can be used with various types of spray nozzles or valve systems. Moreover, the nozzle assembly and control system can be sold as a kit for converting existing birdbaths as well.

These and other objects, advantages, purposes and features of the invention will become more apparent from a study of the following description taken in conjunction with the drawings.

BRIEF DESCRIPTION OF THE DRAWINGS

FIG. 4 is a front view of the preferred form of the control system including the electrical timing controls and fluid valves;

FIG. 5 is a sectional side elevation of the control system valving taken along plane V-V of FIG. 4; and FIG. 6 is a front elevation of a second embodiment of a control system usable with the present invention.

DESCRIPTION OF THE PREFERRED EMBODIMENTS

Figure 1:
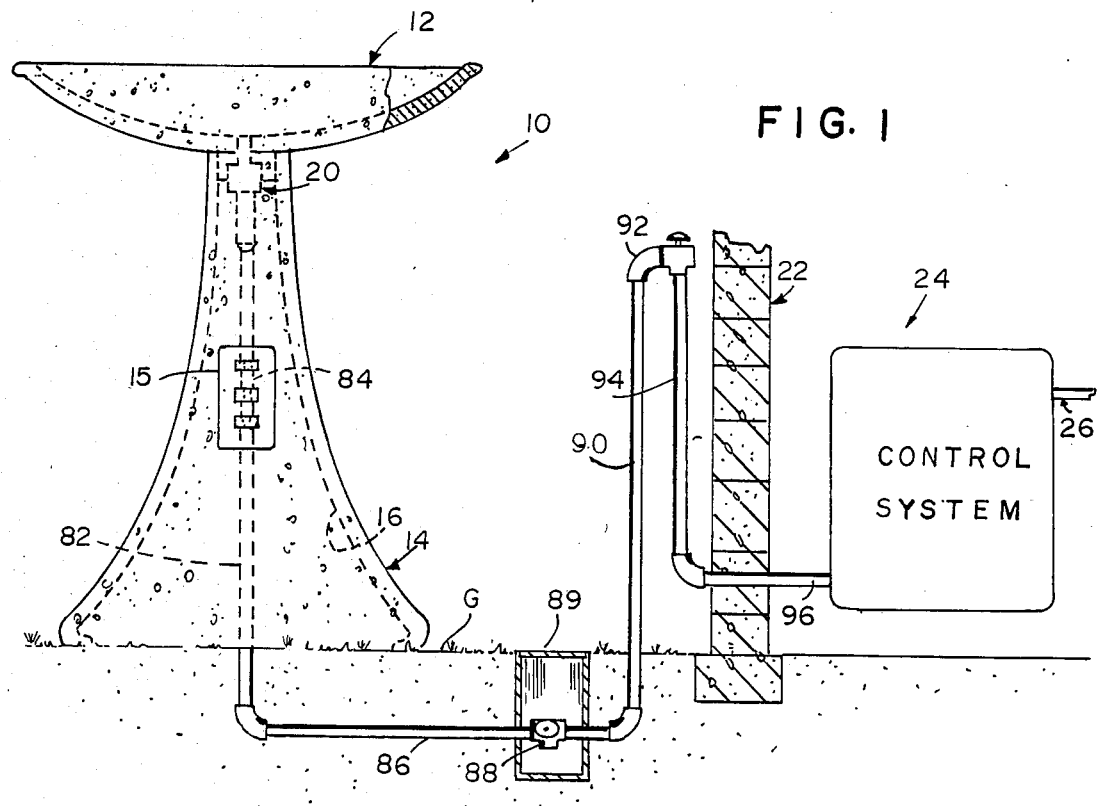
FIG. 1 is a partially schematic, side elevation of the preferred embodiment of the birdbath assembly of the present invention shown partially in section.

Referring now to the drawings in greater detail, FIG. 1 illustrates a preferred embodiment 10 of the self-cleaning birdbath assembly of the present invention. The overall assembly includes a birdbath bowl 12 supported above ground level G on a conventional, hollow support pedestal 14 in a yard area of a residence or commercial building. The birdbath assembly includes a water directing nozzle assembly 20 in the central bottom area of the bowl 12 within the hollow interior 16 of pedestal 14. Nozzle assembly 20 is connected by appropriate plumbing or piping to a water flow control system 24. The piping extends partially underground to a position adjacent the exterior wall 22 of a building. There the piping enters the building for connection to control system 24 and an appropriate source of pressurized water 26. The birdbath structure itself may thus be placed in a yard adjacent a residential or commercial building while the more delicate, weather sensitive controls are located inside the building to provide greater durability and longer life for the assembly.

Figure 2:
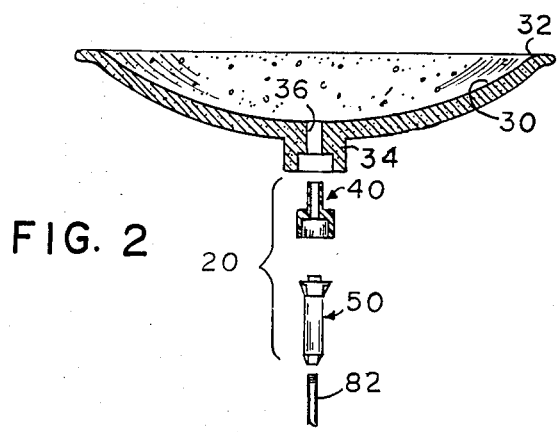
FIG. 2 is a sectional, exploded side elevation of the bowl, mounting collar and spray nozzle assemblies forming a part of the present invention.
Figure 3:
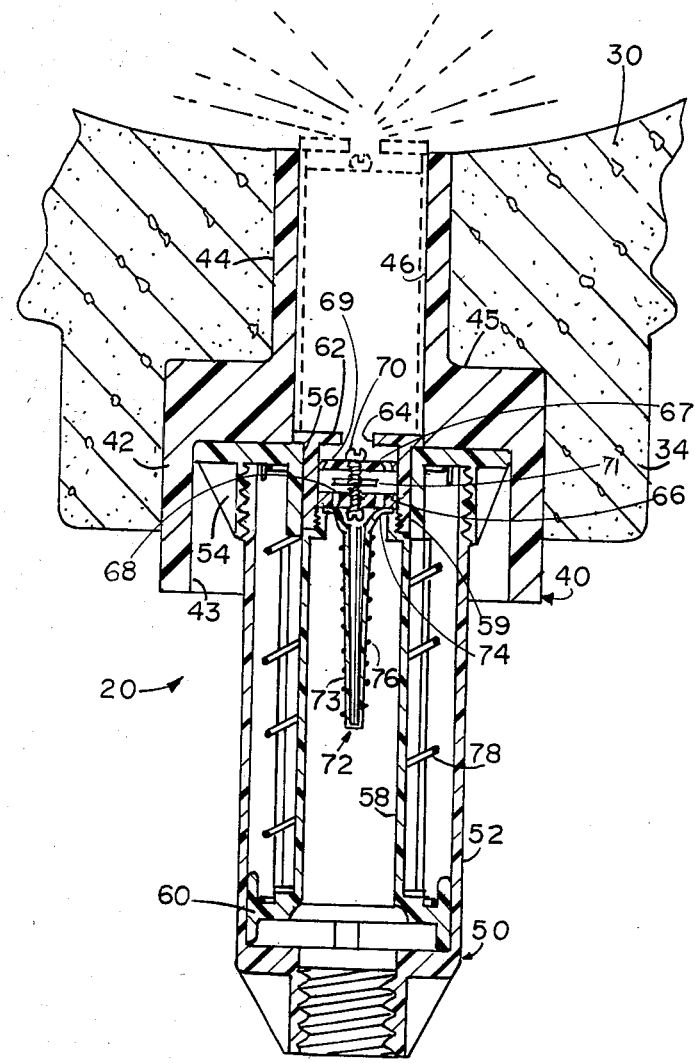
FIG. 3 is an enlarged, sectional, side elevation of the bottom of the bowl including the spray nozzle assembly and showing the spray nozzle in phantom in its extended position.

As shown in FIGS. 1–3, bowl 12 is shallow, partially spherical, and has a curved inner surface 30 and an annular upper, circumferential edge 32. Surface 30 is preferably coated with a layer of Teflon (trademark) or an epoxy paint to ease the loosening of dirt or effluents therefrom. The central bottom portion of the bowl includes a downwardly extending protrusion or cylinder 34 through which extends a contoured aperture 36. Aperture 36 passes completely through the bowl from the bottom exterior through interior surface 30. Nozzle assembly 20 is designed to be received in aperture 36 such that the spray nozzle of that assembly will extend into the inside of the bowl through surface 30 and retract or withdraw to its inoperative position when the filling, cleaning, emptying and refilling cycle is completed.

With specific reference to FIGS. 2 and 3, the nozzle assembly 20 includes a nozzle unit 50 mounted on the interior of a contoured mounting collar 40. Collar 40 has a hollow, cylindrical base 42 with a cylindrical interior surface 43. The interior space of collar base 42 communicates with a central aperture 46 extending through the upper wall 45 of cylindrical base 42 and an upwardly extending cylindrical extension 44 which is concentric with collar base 42.

Nozzle unit 50 is mounted with a suitable adhesive or other retaining means inside collar base 42 against upper wall 45. Nozzle unit 50 includes an outer cylindrical tube 52 which is closed at its upper end by an annular top cap 54 having a central aperture 56 therethrough. Telescopically mounted within aperture 56 through top cap 54 is a sliding inner sleeve or tube 58. A cylindrical nozzle end 59 is threadably mounted on the top, threaded end of tube 58. Tube 58 also has a radially extending, outer flange 60 at its lower end. Nozzle end 59 has an annular top wall 62 including a central aperture 64 through which water is sprayed 360° around the opening when the nozzle is operated.

Spaced slightly below top wall 62 in nozzle end 59 are a pair of spaced inner walls 66, 67. Lower inside wall 66 includes a plurality of circumferentially spaced, axially extending water passages 68 therethrough leading to the space between walls 66, 67. Upper inside wall 67 includes a plurality of tangentially extending, inclined water passages 69 therethrough. Mounted along the central axis of walls 66, 67 is a spray adjusting screw 70 having a slot at either end to enable adjustment. A water regulating disc 71 is mounted on screw 70 intermediate walls 66, 67. As screw 70 is rotated through aperture 64 or from the bottom side of wall 66 with a screw driver or the like, disc 71 is moved toward or away from upper wall 67, and thus passages 69, to change the coarseness of the spray which passes out through aperture 64. Extending downwardly from the undersurface of inner wall 66 is an elongated filter/strainer 72 which is formed separately from inner tube 58 and has an upper flange 74 with an outside diameter such that flange 74 rests atop tube 58 and against the underside of lower inside wall 66. Flange 74 is held in that position when nozzle end 59 is threaded onto the top end of tube 58. The downwardly extending, lower, tapered portion 73 of filter/strainer 72 has a plurality of longitudinal slots formed by longitudinally extending ribs held in place by surrounding annular rings 76 such that water may pass through the slots from the lower end of tube 58, upwardly through water passages 68, 69 and out through aperture 64 for spraying purposes when sufficient water pressure is applied. However, the slots in tapered filter portion 73 prevent the passage of large foreign objects or the like which might otherwise clog the nozzle. When nozzle unit 50 is disassembled, filter/strainer 72 may be removed and easily washed or cleaned to once again allow full, free water flow.

Nozzle unit 50 also includes a coil spring 78 which seats against the inside surface of top cap 54 and against the bottom flange 60 on inner sleeve 58 to urge the sleeve 58 downwardly with respect to top cap 54. However, when water pressure is applied to the end of outer cylinder 52, and the flow of water is sufficiently high, the constriction of the water passages 68 causes sufficient pressure buildup to overcome the force of spring 78 and cause the sliding inner sleeve 58 to be raised with respect to top cap 54 through central aperture 46 of mounting collar 40 until the spring 78 is completely compressed and bottom flange 60 engages the bottom of top cap 54. During the raising of the spray nozzle area including aperture 64 at the upper end of inner sleeve 58 while the water in the bowl is being agitated, the spray from the nozzle impinges upon substantially the entire inner surface of the birdbath bowl to begin emptying the water and effluents from the bowl. When the nozzle is completely raised, the spray is directed above the upper rim 32 and any remaining water in the bowl drains downwardly toward the nozzle where the upwardly directed spray from the raised nozzle draws and pulls the remaining water and effluents upwardly by a suction-like effect to completely empty the bowl. Thus, it is a combination of the force of the water spray and suction which empties the bowl. The preferred nozzle unit 50 has a 360° spraying radius, while the coarseness of the spray may be adjusted by rotating adjusting screw 70 and disc 71 inwardly or outwardly with respect to inner wall 66 from either end of screw 70. Should any adjustment to the level of the upper end of nozzle inner sleeve 58 be necessary, one or more O-rings or other spacers (not shown) may be inserted between top cap 54 and wall 45 when nozzle unit 50 is assembled in collar 40.

Nozzle unit 50 is molded of plastic and is preferably of the type sold commercially by the Rain Bird Sprinkler Manufacturing Corporation of Glendora, Calif. under Model No 1900. Other nozzles and materials may be used within the scope of the present invention.

Referring again to FIG. 1, nozzle assembly 20, and specifically the lower end of nozzle unit 50, is connected by appropriate piping, including various lengths of plastic or other corrosion resistant pipe, to the water supply 26 through water flow control system 24. Such plumbing includes a vertical length 82 of pipe which extends downwardly through hollow pedestal 14 to a position below the ground to prevent freezing of the water in the pipe in colder temperatures as much as possible. A threaded connection sleeve 84 is included in pipe 82 to allow disconnection of the pipe for removal or repair of the bowl and nozzle when desired. Access to the connection sleeve 84 and the interior 16 of pedestal 14 is provided through a removable door 15 in the exterior of pedestal 14.

Below the pedestal, a horizontal length 86 of pipe extends toward the building or shelter in which the control system is located. Included in the underground length of pipe 86 is a T-valve 88 located within a protecting container or box 89 set within the ground. Once the main water supply 26 has been shut off, the top of box 89 may be removed to open valve 88 for drainage of the bowl and system for storage during winter months. Immediately adjacent building exterior wall 22, a second vertical pipe length 90 connects the horizontal, underground pipe 86 to an antisiphon valve 92. Antisiphon valve 92 prevents any water in the system downstream of valve 92 from returning back through the system into the main water supply 26. A second downwardly extending pipe length 94 is connected to the opposite side of antisiphon valve 92, after which a second horizontal length of pipe 96 enters the building through wall 22 and is joined in fluid communication to the control system 24 as described hereinafter.

Referring now to FIGS. 4 and 5, a first form of the preferred water flow control system for the self-cleaning birdbath assembly 10 is shown in greater detail. A pipe leading from a source 26 of pressurized water such as a typical city water system or private well system is connected through appropriate fluid connections to an inlet pipe 100, a water filter 102 for prevention of scale buildup within the valve system especially in areas with hard water, and a pressure regulator 104 which may be adjusted to an appropriate pressure to operate the system. Filter 102 is of the type sold under the term "lime filter" by Mor-Flo American and is described in U.S. Pat. No. 4,216,092, the disclosure of which is hereby incorporated by reference. Pressure regulator 104 is a type of valve which is set for approximately 45 pounds of water pressure in the preferred embodiment and can accommodate either private, pumped well systems, or city water systems which normally operate at 60 to 80 p.s.i. and thus must be reduced to approximately 45 p.s.i. for operation of the present system. Thus, the system can be preset and tested at the factory and will accommodate nearly any water system with little or no adjustment being necessary upon installation.

After passing through pressure regulator 104, water is carried via pipe 106 to a pair of pipes 108, 110 which each include an electrically operated solenoid valve 112, 114 respectively. Following valves 112, 114, pipes 108, 110 are reconnected via pipe 116 which, in turn, is connected to pipe 96 which, as described above, leads to water directing nozzle assembly 20 and the birdbath bowl 12. Accordingly, valves 112, 114 are connected in parallel fluid communication with one another and are designed to be operated sequentially and separately from one another to control water flow through pipe 116 to the water directing nozzle unit 20. Pipe 106 may also include a petcock 107 for system drainage and removal of entrapped water during cold or warm weather storage when the system is closed and shut off to prevent water expansion and/or pressure buildup and any joint loosening or leakage.

Each of the electric solenoid operated water valves 112, 114 is preferably made from durable corrosion resistant molded plastic material and is of the type sold by the Rain Bird Sprinkler Manufacturing Corporation of Glendora, Calif. under Model No. AGV075 or AGV100. Each of the valves includes a main body 120 (FIG. 5) with an angularly oriented, solenoid operated valve portion 118 adapted to open and close the main body portion 120 to allow water flow therethrough. Valve portion 118 is adjustable to vary the amount of water flowing through main body 120 by rotating collar 122. Solenoid operating valve portion 118 has a manual control for operation in periods when electrical power is not available. Valve portion 118 typically operates on a low voltage of approximately 24 volts thereby preventing injury from high voltage and also lowering overall energy use for the system. Valves 112, 114 may also include antisiphon valves to prevent back flow through the system If included, such antisiphon valves would eliminate the need for separate antisiphon valve 92, although both may be used simultaneously in the system should plumbing codes require it.

Typically, solenoid operated valve 112 is set to provide low water volume flow through pipe 116 to the nozzle assembly 20. Preferably, such low water volume flow takes place at approximately 1 gallon per minute. Valve 114, on the other hand, is set to operate at a higher or full volume water flow to obtain the desired amount of agitation and water spray.

Valves 112, 114 are controlled in sequential manner by an electrically operated, computerized, solid state digital controller/timer 124. Preferably, controller/timer 124 is a four station, three cycle sprinkler control sold commercially by the Rain Bird Sprinkler Manufacturing Corporation of Glendora, Calif. under Model No. CC4. Such Rain Bird sprinkler controller/timer is described in U.S. Pat. No. 4,176,395, the disclosure of which is hereby incorporated by reference.

Power for operation of controller/timer 124 is provided through appropriate wiring 126 and a Class 2 transformer 128 sold under Model No. BA2412V also by Rain Bird Sprinkler Manufacturing Corporation. Transformer 128 is plugged into a typical residential or commercial duplex electrical outlet 130 of 110-120 volts. The preferred input for transformer 128 is 120 volts, 60 Hertz, 25 watts. It produces an output of either 24 volts AC at 0.75 amps or 11 volts AC at 0.25 amps. In this case, the 24 volt setting is used. Also plugged into outlet 130 is a small light 132, which may be photoelectrically controlled to turn on automatically at low light levels, to illuminate the entire control panel and control system 24 in night or evening conditions if the control system is mounted in a location where other light is not available. Controller/timer 124 is also connected through appropriate output wires to a terminal block 134 which also receives the control wires from valves 112, 114 for electrical connection to the controller/timer.

In operation, the controller/timer 124 is set for operation in three cycles typically at 3:00 a.m., 11:00 a.m. and 5:00 p.m. during a 24 hour time period. The controller/timer is set to begin each operative cycle with valve 112, the low water volume valve. Valve 112 is opened by controller/timer 124 for approximately one minute which allows water to flow through pipe 116 and the other piping in the system at low volume flow, through nozzle assembly 20 to fill up bowl 12 in case any of the water in the bowl has evaporated, been washed out by rain, wind or use by the animals, or otherwise removed. Thus, the first stage in the operation is to completely fill the bowl prior to the cleaning action. During such filling operation, the rotation of the earth causes the water in the bowl to slowly begin rotation counterclockwise. This begins the water action in the bowl which loosens any dirt or effluents in the water or on the surface 30 of the bowl.

After the one minute operation of valve 112, controller/timer 124 shuts off valve 112 and, following a momentary delay, opens valve 114, the high water volume valve. Valve 114 is opened for a full two minutes which provides the agitation and emptying stage of the cycle. Once the high volume water flow is turned on, flow through apertures 68 in inner wall 66 and upwardly through aperture 46 in collar 40 is restricted and cannot accommodate the increased high volume flow. The increased pressure which results raises the sliding inner sleeve 58 such that the spray nozzle area of the inner sleeve is raised slightly above inner bowl surface 30 as described above. This allows the 360° spraying to proceed. However, since the bowl 12 is filled with water, the spraying action begins to agitate and bubble the water in the birdbath bowl and, because of the rotation of the earth, allows more vigorous counterclockwise circulation to begin within the bowl. The combined agitation, bubbling and swirling which result loosen any foreign objects, dirt or other effluents within the bowl and mix them into solution with the water already there. The rotation increases until the spraying action of the nozzle breaks the surface of the water in the bowl due to the bubbling action and agitation. As the operation of valve 114 continues through its two minute stage, the spraying action from aperture 66 in the spray nozzle area of nozzle unit 50 pushes the bubbling, agitated, swirling water out of the bowl over annular lip 32 until the combined force of the spraying water and suction effect substantially completely removes or flushes all water and any contained dirt and effluents completely out of the bowl.

At the end of the two minute agitation, cleaning, emptying stage, valve 114 is shut off by controller/timer 124 and inner sleeve 58 withdraws or retracts to its lower position shown in solid in FIG. 3 because of the reduced water flow. At this point in the cycle, controller/timer 124, after a momentary delay, again opens low volume valve 112 to allow water to again flow through nozzle unit 50 but at a low speed flow. This flow is not sufficient to raise the inner tube of nozzle unit 50 against the resistance of spring 78, but does allow water to move upwardly through aperture 46 to again fill the bowl for reuse by birds and other animals. After one minute or a sufficient time period which can be judged after operation of the assembly for a few cycles, the controller/timer shuts off valve 112 and the cycle is complete. It will thus be understood that through the operation of the control system 24 and the use of commonly available water at conventional pressures, the present invention causes the birdbath bowl to be filled, agitated and self-cleaned, emptied and refilled all without human intervention and on an automatic, cycled basis throughout each 24 hour time period.

As shown in FIG. 6, a second embodiment 140 of the control system is illustrated. In this embodiment, where like structures are designated by the same number as in embodiment 24 with the addition of a prime, a third valve is used in addition to the two valves 112' and 114'. The only difference in operation of control system 140 is the operation of the third valve 142 in place of the second operation of valve 112 in each cycle. Thus, in embodiment 140, valves 112' and 142 are both set for low volume water flow and are controlled by a controller/timer such as that at 124 to operate at the beginning and end of each operating cycle. Valve 114' is set for high water flow and operates during the middle of each cycle as described above. Use of the third valve increases the life and durability of the control system since valve 112' is operated only half as much. Also, although not shown, filter 102 and pressure regulator 104 may be used with control system 140 just as they are in control system 24.

The present invention also encompasses the manufacture and sale of a kit including a water directing nozzle assembly 20, and an appropriate control system such as that shown at 24 or 140 which can be sold for installation with appropriate lengths of piping as described herein and an existing birdbath bowl and support pedestal on a do-it-yourself basis. All that need be done is to combine the control system and nozzle in an existing birdbath assembly in the manner described above and set the controller/timer in the control system for operation in the described manner to produce the complete assembly as described.

Accordingly, the present invention provides a birdbath assembly with automatic filling, cleaning, emptying and refilling without human intervention. The spray cleaning assembly is hidden and extends and retracts during cycling for efficient operation. The assembly is low in maintenance and includes high reliability parts with more delicate portions of the assembly, namely, the control system, designed to be sheltered within a building or other confine adjacent to but remote from the birdbath itself. Although one form of spray nozzle assembly is shown and described herein, the invention may be used with various other types of nozzles as well.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow The embodiments of the invention in which an exclusive property or privilege is claimed are defined as follows:

1. A birdbath assembly adapted for controlled filling, self-cleaning and emptying with water pressure comprising:
   a bowl for receiving and holding a quantity of water, said bowl having an inner surface and a top edge;
   means for supporting said bowl;
   water directing means on said bowl and operative through the inside surface of said bowl for sequentially filling said bowl by inserting water under pressure into said bowl, agitating the water in said bowl to generate loosening of any dirt or loose substances in said bowl, removing/expelling the water and loosened substances from said bowl, and refilling said bowl with water, said water directing means including fluid responsive means on said bowl for movement into said bowl to a position at least partially within said bowl for agitation and subsequent removal of any water and effluents in said bowl in response to a first volume flow of water through said water directing means and for withdrawal from said bowl in response to a second, lesser volume flow of water through said water directing means, said fluid responsive means including water spraying means for spraying water toward and/or against said inside surface of said bowl during movement of said fluid responsive means into said bowl and for spraying water over said top edge and out of said bowl while said fluid responsive means are in said position within said bowl; and
   connection means for connecting said water directing means with a source of water under pressure.

2. The assembly of claim 1 including control means external of said bowl for remotely controlling the rate of flow of water through said water directing means.

3. The assembly of claim 2 wherein said control means includes remotely operated control valve means in fluid communication with said connection means for providing sequential low and high volume water flow to said water directing means.

4. The assembly of claim 3 wherein said control means further includes timing means for controlling the length of low and high volume water flow through said control valve means.

5. The assembly of claim 4 wherein said control valve means are electric solenoid operated; said timing means being adjustable and electrically operated to automatically vary the low and high volume water flow for preset periods of time.

6. The assembly of claim 1 wherein said water spraying means include a nozzle; and said fluid responsive means further include means for slidably moving said nozzle with water pressure at least partially into said bowl.

7. The assembly of claim 6 wherein said nozzle includes spray means for spraying water 360° therearound.

8. The assembly of claim 7 wherein said means for slidably moving said nozzle include a mounting collar in the bottom of said bowl, a sleeve including said nozzle, said sleeve slidably mounted in said collar for movement between a lowered position wherein said nozzle is below the bottom inside surface of said bowl and said position within said bowl which is a raised position wherein said nozzle protrudes above said bottom inside surface of said bowl; biasing means for urging said sleeve and nozzle to said lowered position; whereby the application of water pressure is adapted to lift said sleeve and nozzle to its raised position.

9. The assembly of claim 8 including means for adjusting said nozzle to change the degree of coarseness of the spray.

10. A birdbath assembly adapted for controlled filling, self-cleaning and emptying with water pressure comprising:
    a bowl for receiving and holding a quantity of water;
    means for supporting said bowl;
    water directing means on said bowl and operative through the inside surface of said bowl for sequentially filling said bowl by inserting water under pressure into said bowl, agitating the water in said bowl to generate loosening of any dirt or loose substances in said bowl, removing/expelling the water and loosened substances from said bowl, and refilling said bowl with water;
    connection means for connecting said water directing means with a source of water under pressure;
    control means external of said bowl for remotely controlling the rate of flow of water through said water directing means; said control means including first and second solenoid operated fluid valves connected in parallel fluid communication with said water directing means; said first valve adapted to provide a low volume of water through said water directing means when opened; said second valve adapted to provide a high volume of water through said water directing means when opened; electrically operated timing means electrically connected to said first and second valves; wiring means for connecting said timing means to a source of eelctrical energy; said timing means being preset to separately and sequentially open said first and second valves for predetermined periods of time to cause said water directing means to operate first at low volume with said first valve, second at high volume with said second valve, and third at low volume again with said first valve.

11. The assembly of claim 10 wherein said control means include a third solenoid operated valve adapted to provide a low volume of water when opened: said third valve being connected in parallel fluid communication with said first and second valves to said connection means and electrically connected to said timing means for predetermined, sequential, opening following the opening of said first and second valves to cause said water directing means to operate first at low volume with said first valve, second at high volume with said second valve, and third at low volume again with said third valve.

12. The assembly of claim 10 including regulator means for regulating the pressure of water through said valves and filter means for filtering impurities out of said water; said regulator means and filter means being connected in series fluid communication with and upstream of said first and second fluid valves.

13. The assembly of claim 12 including drainage valve means for draining water from said assembly during periods of nonuse.

14. The assembly of claim 10 wherein each of said first and second valves is adjustable such that the volume of water flow through each when opened may be individually preset.

15. A birdbath assembly for controlled automatic filling, self-cleaning and emptying with water pressure comprising:
a bowl for receiving and holding a quantity of water, said bowl having an inner surface and a top edge;
means for supporting said bowl;
a spray nozzle mounted for movement through the inside surface of said bowl, said spray nozzle adapted to fill said bowl with water, agitate the water and any effluents therein, empty said bowl of any water and effluents, and refill said bowl;
fluid responsive means for moving at least a portion of said spray nozzle through said inside bowl surface to a position within said bowl in response to water pressure to direct water spray for agitation of water within said bowl and subsequent removal of the water and effluents from the bowl;
said spray nozzle including water spraying means for spraying water toward and/or against said inside surface of said bowl during movement of said spray nozzle into said bowl and for spraying water over said top edge of said bowl and out of said bowl while said spray nozzle is in said position within said bowl; and
connection means for connecting said spray nozzle with a source of water under pressure.

16. The assembly of claim 15 wherein said spray nozzle includes means for directing water spray 360° therearound.

17. The assembly of claim 15 wherein said fluid responsive means include a mounting collar in the bottom of said bowl, a sleeve including said nozzle, said sleeve slidably mounted in said collar for movement between a lowered position wherein said nozzle is below the bottom inside surface of said bowl and said position within said bowl which is a raised position wherein said nozzle protrudes above said bottom inside surface of said bowl; biasing means for urging said sleeve and nozzle to said lowered position; whereby the application of water pressure is adapted to lift said sleeve and nozzle to its raised position.

18. The assembly of claim 17 including means for adjusting said nozzle to change the degree of coarseness of the spray.

19. The assembly of claim 15 including control means external of said bowl for remotely controlling the rate of flow of water through said spray nozzle.

20. The assembly of claim 19 wherein said control means includes remotely operated control valve means in fluid communication with said connection means for providing sequential low and high volume water flow to said spray nozzle.

21. The assembly of claim 20 wherein said control means further includes timing means for controlling the length of low and high volume water flow through said control valve means.

22. The assembly of claim 21 wherein said control valve means are electric solenoid operated; said timing means being adjustable and electrically operated to automatically vary the low and high volume water flow for preset periods of time.

23. A birdbath assembly for controlled automatic filling, self-cleaning and emptying with water pressure comprising:
a bowl for receiving and holding a quantity of water;
means for supporting said bowl;
a spray nozzle mounted for movement through the inside surface of said bowl, said spray nozzle adapted to fill said bowl with water, agitate the water and any effluents therein, empty said bowl of any water and effluents, and refill said bowl;
fluid responsive means for moving at least a portion of said spray nozzle through said inside bowl surface in response to water pressure to direct water spray within the bowl for agitation and subsequent removal of the water and effluents from the bowl;
connection means for connecting said spray nozzle with a source of water under pressure;
control means external of said bowl for remotely controlling the rate of flow of water through said spray nozzle; said control means including remotely operated control valve means in fluid communication with said connection means for providing sequential low and high volume water flow to said spray nozzle and timing means for controlling the length of low and high volume water flow through said control valve means;
said control valve means being electric solenoid operated and including a plurality of fluid valves connected in parallel with one another, said timing means being adjustable and electrically operated to automatically vary the low and high volume water flow for preset periods of time and including means for sequentially, separately opening said valves to control operation of said spray nozzle.

24. A kit for converting a birdbath bowl or receptacle of the type having an inner surface and a top edge to a controlled, water pressure operated filling, self-cleaning and emptying birdbath assembly comprising:
nozzle means for filling the bowl with water, agitating the water and any effluents therein, emptying the bowl of any water and effluents, and refilling the bowl;
fluid responsive means for moving at least a portion of said nozzle means from a first position outside the inner surface of the bowl to a second position within the bowl in response to water pressure for agitation and subsequent removal of the water and effluents from the bowl;
said nozzle means including water spraying means for spraying water toward and/or against the inside surface of the bowl when mounted on the bowl during movement of said nozzle means toward said second position and for spraying water over the top edge and out of said bowl while said nozzle means is in said second position; and
connection means for connecting said nozzle with a source of water under pressure.

25. The kit of claim 24 wherein said fluid responsive means include a mounting collar adapted to be received in an aperture extending through the bottom of the bowl, a sleeve including said nozzle means, said sleeve slidably mounted in said collar and adapted for movement between said first position which is a lowered position wherein said nozzle means is below the bottom inside surface of the bowl when the collar is mounted therein, and said second position which is a raised position wherein said nozzle protrudes above the bottom inside surface of said bowl; biasing means for urging said sleeve and nozzle means to said lowered position; whereby the application of water pressure is adapted to lift said sleeve and nozzle means to its raised position.

26. The kit of claim 25 including control means adapted to be mounted externally of the bowl for remotely controlling the rate of flow of water through said nozzle means.

27. The kit of claim 26 wherein said control means includes remotely operated control valve means in fluid communication with said connection means for providing sequential low and high volume water flow to said nozzle means.

28. The kit of claim 27 wherein said control means further includes timing means for controlling the length of low and high volume water flow through said control valve means.

29. The kit of claim 28 wherein said control valve means are electric solenoid operated; said timing means being adjustable and electrically operated to automatically vary the low and high volume water flow for preset periods of time.

30. The kit of claim 24 including control means adapted to be mounted externally of the bowl for remotely controlling the rate of flow of water through said nozzle means.

31. A kit for converting a birdbath bowl or receptacle to a controlled, water pressure operated filling, self-cleaning and emptying birdbath assembly comprising:
nozzle means for filling the bowl with water, agitating the water and any effluents therein, emptying the bowl of any water and effluents, and refilling the bowl;
fluid responsive means for moving at least a portion of said nozzle means from a first position to a second position in response to water pressure for agitation and subsequent removal of the water and effluents from the bowl;
connection means for connecting said nozzle with a source of water under pressure;
said fluid responsive means including a mounting collar adapted to be received in an aperture extending through the bottom of the bowl, a sleeve including said nozzle means, said sleeve slidably mounted in said collar and adapted for movement between a lowered position wherein said nozzle means is below the bottom inside surface of the bowl when the collar is mounted therein, and a raised position wherein said nozzle protrudes above the bottom inside surface of said bowl; biasing means for urging said sleeve and nozzle means to said lowered position; whereby the application of water pressure is adapted to lift said sleeve and nozzle means to its raised position;
control means adapted to be mounted externally of the bowl for remotely controlling the rate of flow of water through said nozzle means; said control means including remotely operated control valve means in fluid communication with said connection means for providing sequential low and high volume water flow to said nozzle means and timing means for controlling the length of low and high volume water flow through said control valve means;
said control valve means being electric solenoid operated and including a plurality of fluid valves connected in parallel with one another, said timing means being adjustable and electrically operated to automatically vary the low and high volume water flow for preset periods of time and including means for sequentially, separately opening said valves to control operation of said nozzle means.

* * * * *